US006944659B2

(12) United States Patent
Taggart et al.

(10) Patent No.: US 6,944,659 B2
(45) Date of Patent: Sep. 13, 2005

(54) METHOD AND APPARATUS FOR GATHERING AND TRANSMITTING INFORMATION FOR EVENTS RELATING TO A NETWORKED APPLIANCE

(75) Inventors: John D. Taggart, Boise, ID (US); James Joseph Acevez, Eagle, ID (US); Jay Hager, Baarn (NL); Jeroen van Alphen, Leiden (NL); John David Reardon, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 929 days.

(21) Appl. No.: 09/795,101

(22) Filed: Mar. 1, 2001

(65) Prior Publication Data

US 2002/0143908 A1 Oct. 3, 2002

(51) Int. Cl.[7] ...................... G06F 15/173; G06F 15/16; G06F 11/00

(52) U.S. Cl. ......................... 709/224; 709/223; 714/48; 714/57

(58) Field of Search ................................ 709/223, 224; 714/1, 25, 48, 37, 57

(56) References Cited

U.S. PATENT DOCUMENTS

| | | | | |
|---|---|---|---|---|
| 5,113,489 A | | 5/1992 | Cihiwsky et al. | 395/113 |
| 5,580,177 A | | 12/1996 | Gase et al. | 400/61 |
| 5,706,411 A | | 1/1998 | McCormick et al. | 395/113 |
| 5,727,135 A | | 3/1998 | Webb et al. | 395/113 |
| 6,170,067 B1 | * | 1/2001 | Liu et al. | 714/48 |
| 6,185,379 B1 | | 2/2001 | Lay et al. | 399/11 |
| 6,226,761 B1 | * | 5/2001 | Berstis | 714/37 |
| 6,259,956 B1 | * | 7/2001 | Myers et al. | 700/80 |
| 6,269,412 B1 | * | 7/2001 | Liu et al. | 710/19 |
| 6,298,449 B1 | * | 10/2001 | Carter | 713/340 |
| 2001/0035965 A1 | | 11/2001 | Blasius | 358/1.1 |
| 2002/0124070 A1 | * | 9/2002 | Pulsipher | 709/223 |

FOREIGN PATENT DOCUMENTS

| | | | |
|---|---|---|---|
| EP | 0749065 A1 | 12/1996 | G06F/3/12 |
| EP | 0945781 A2 | 9/1999 | G06F/3/12 |
| EP | 1024424 A2 | 8/2000 | G06F/3/12 |
| EP | 1152325 A1 | 11/2001 | G06F/3/12 |
| GB | 2270180 | 3/1994 | G08B/25/14 |

* cited by examiner

*Primary Examiner*—Paul H. Kang

(57) ABSTRACT

Gathering data and providing messages concerning a networked appliance. A software application in the appliance detects the occurrence of events and records indications of the events in real-time or near real-time. Certain events such as appliance errors, or events for which a user desires notification, are associated with alert messages. Upon detecting one of those events, the software application captures a snapshot or set of the events and transmits to a user machine, system server, or web site the set of events along with the alert message and a link to the system server or web site. Upon viewing the alert message, such as via a web page, the user can enter a command to send the events and alert message to the system server or web site for use in servicing the appliance.

20 Claims, 4 Drawing Sheets

METHOD AND APPARATUS FOR GATHERING AND TRANSMITTING INFORMATION FOR EVENTS RELATING TO A NETWORKED APPLIANCE

FIELD OF THE INVENTION

The present invention relates to an apparatus and method for gathering information for events relating to a networked appliance and transmitting alert messages concerning particular events.

BACKGROUND OF THE INVENTION

Computers are often connected to or networked with various appliances such as printers. These appliances can experience errors such as when a printer has a paper jam or is out of toner. A computer user may only detect the error through a physical inspection of the appliance. Upon detecting the error, the computer user typically must manually call or send an e-mail to the manufacturer or other company that services the appliance. The use of a manual way to send the notification results in a cumbersome and inefficient way to service the appliance.

Also, the user's physical inspection of the appliance may not necessarily detect all or most events relevant to the error. For example, a paper jam in a printer can be caused by a failure of mechanical components; however, the user may only detect the paper jam and not detect anything concerning the components causing the error. Therefore, when reporting the error, the user may not necessarily have the best or most relevant information for the servicing company, which can also result in a delayed or inefficient servicing of the appliance.

Accordingly, a need exists for an improved way to detect and report errors or other events concerning networked appliances.

SUMMARY OF THE INVENTION

An apparatus and method consistent with the present invention can gather data and provide messages concerning a networked appliance. The method and apparatus are used to detect an occurrence of an event relating to the networked appliance and to record an indication of the event. They are also used to determine whether the event is associated with an alert message and to selectively transmit the alert message to a user machine, system server, or web site based upon that determination.

The apparatus and method can repeatedly record the indications of the events. Upon detecting an event associated with an alert message, a set of the indications can be selected and transmitted with the alert message. Upon viewing the alert message when transmitted to a user machine, a user can, for example, use the message in order to report to a system server or web site the indications of the events and errors for the appliance.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Exemplary embodiments of the present invention record information concerning events relating to appliances and transmit the information over a network. The events effectively provide a record of the appliance operation and, upon detection of a particular type of event, a snapshot of events can be obtained from the recorded events for transmission to a remote computer, machine, or web site. For example, when an appliance experiences an error, a set of events relating to the error can be gathered and electronically transmitted to a remote computer or web site to provide an alert or notification of the error. Alerts for other types of events can be provided as well, such as events relating to a particular type of operation or status for an appliance, or events for which the user desires notification. The use of network communications provides an efficient way to provide notification to remote computers or web sites concerning appliances connected to the network.

Figure 1:
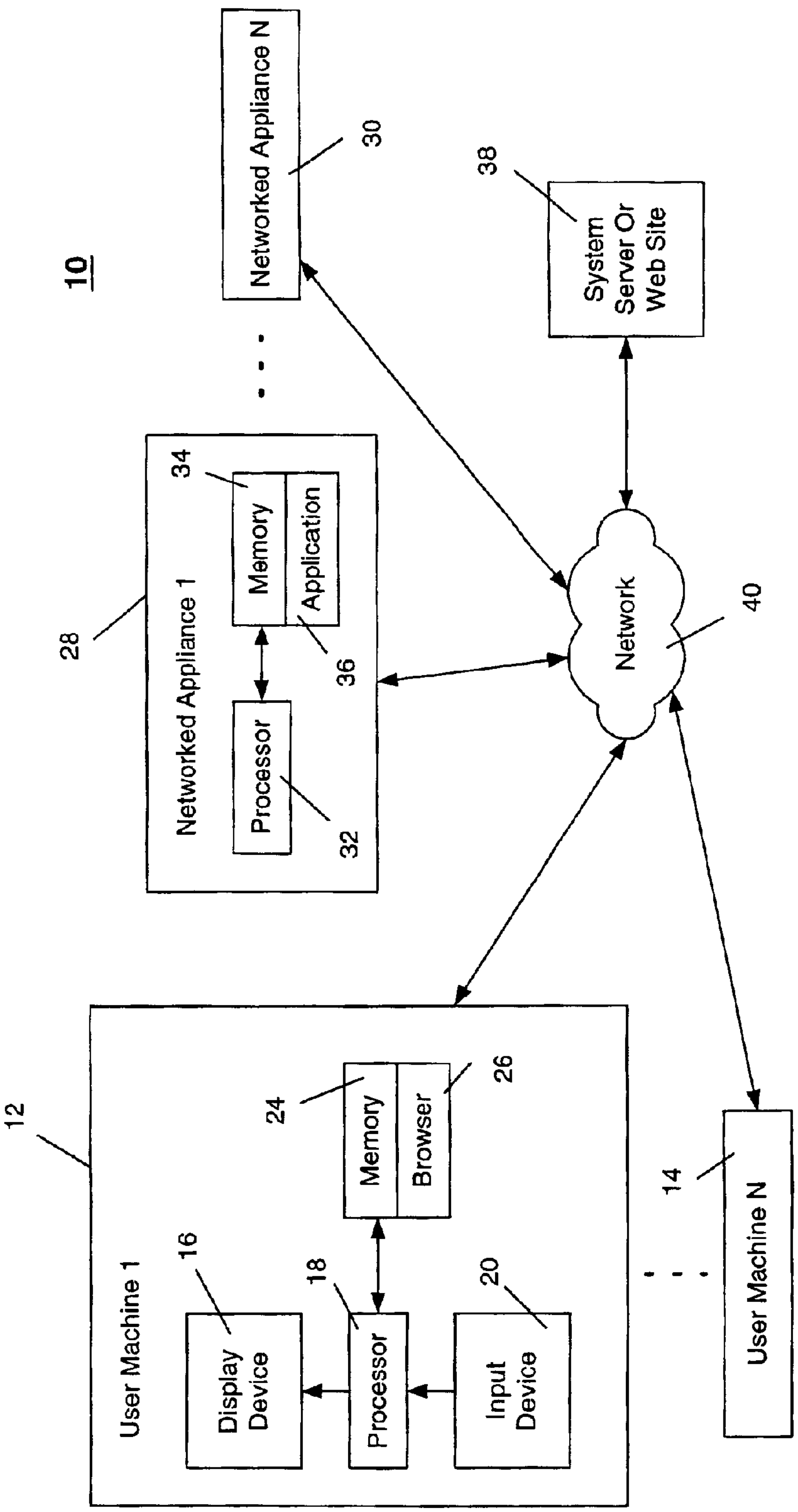
FIG. 1 is a diagram of a networked system for gathering data for appliances and providing alert messages concerning the appliances.

FIG. 1 is a diagram of a networked system 10 for gathering data for appliances and providing alert messages concerning the appliances. System 10 can include one or more user machines 12 and 14 connected to a network 40 such as the Internet, an intranet, or other local area or wide area wireline or wireless network. As illustrated in user machine 12, each of the user machines can include, for example, a processor 18, a display device 16, an input device 20, a memory 24. Processor 18 is connected with memory 24 in order to execute one or more applications stored in the memory such as a web browser 26. A user can enter information or commands into user machine 12 via input device 20, and can view information output on display device 16.

The user machines 12 and 14 are typically connected through network 40 to one or more networked appliances 28 and 30. As illustrated in networked appliance 28, each networked appliance can include, for example, a processor 32 connected with a memory 34. Memory 34 can include one or more applications 36 for execution by processor 32. Each networked appliance typically includes additional components depending upon the type of appliance. For example, if networked appliance 28 is implemented with a printer, it will also include the necessary mechanical and other components to, under control of processor 32, receive information and print the information onto paper or other material. Other examples of networked appliances include a fax machine, other types of display devices such as projectors, and various other types of output devices. The phrase "networked appliance" includes any processor-based device capable of electronic communication over a network.

System 10 also typically includes a system server or web site 38 connected to network 40. System server or web site 38 can represent, for example, a server associated with a company servicing one or more of the networked appliances 28 and 30. Also, as indicated, system server 38 can optionally host a web site. Therefore, alert messages concerning errors or other events in a networked appliance can be electronically sent via network 40 to a system server, a web site, or both. They can also be sent to more than one of each of those entities.

Figure 2:
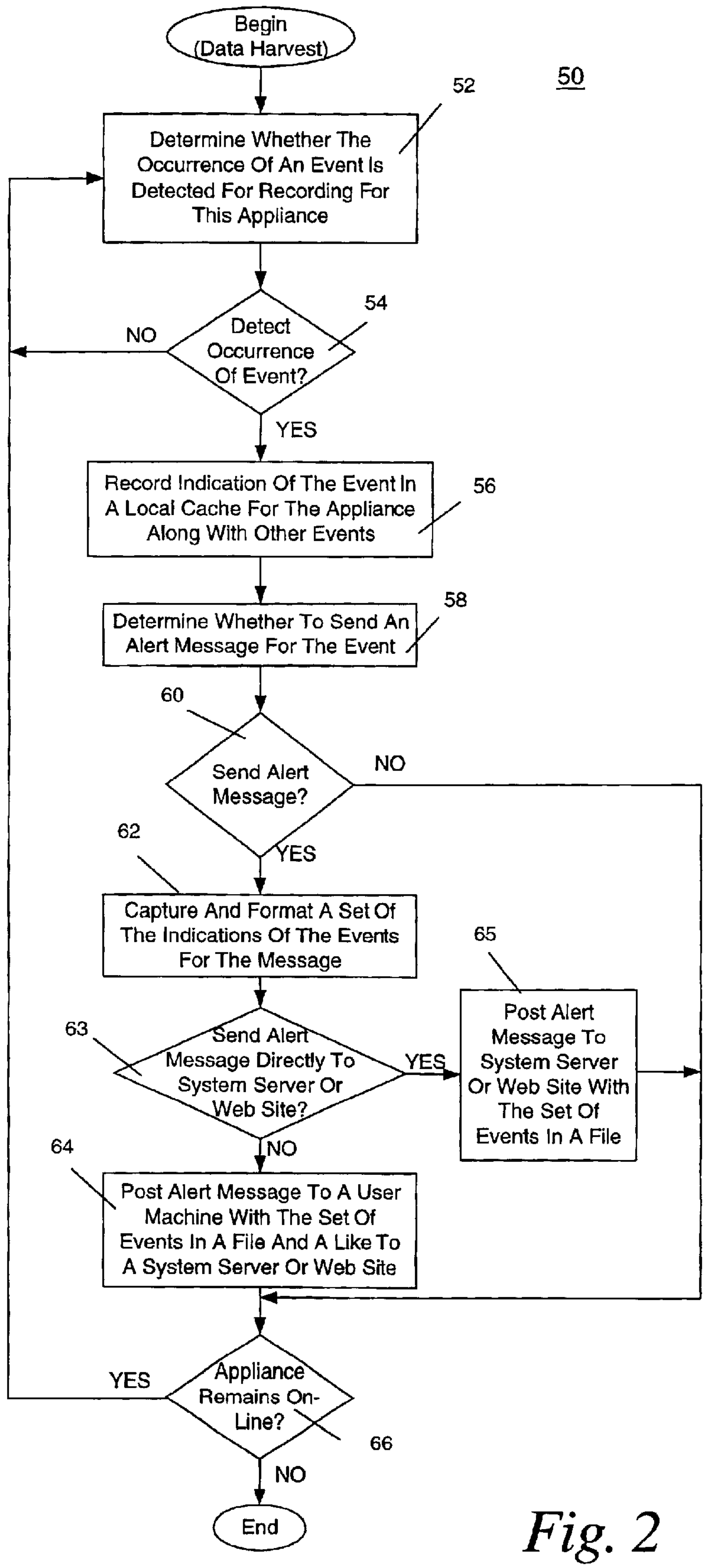
FIG. 2 is a flow chart of a method for recording and posting of event information for networked appliances.

FIG. 2 is a flow chart of a method 50 for harvesting data from networked appliances 28 and 30. Method 50 can be implemented, for example, in software modules stored within memory 34 for execution by processor 32 resident within a networked appliance. In method 50, the appliance determines whether it detects the occurrence of an event for recording for this appliance (step 52). Each particular type of networked appliance can operate in a certain way and produce particular events based upon its own operation. For example, a printer may generate different types of events for recording than a fax machine, and an example of events to record for a printer is provided below. Memory 34 within the networked appliance can store in a data structure an indication of the types of events to record for this particular appliance, and those events can be predetermined, or dynamically changed and updated for the appliance.

If the occurrence of such an event is detected (step 54), the appliance records an indication of the event in a local cache such as memory 34 usually associated with any other events that have been recorded for this appliance (step 56). An indication of an event can include any information related to or identifying the event such as, for example, the event itself, information describing the event, information identifying the event, or information qualifying or quantifying the event. These events are recorded, for example, in real-time or near real-time and in a temporal order based upon when occurrences of them are detected. Alternatively, they can be stored in any order and in a delayed manner. They can be stored in a particular data structure such as an Extensible Markup Language (XML) string, a relational database table, or other structure. Since processor 32 controls operation of the appliance, it can detect the occurrence of a wide variety of events for the appliance, and application 36 can be configured to monitor those events and record selected ones of the events.

The appliance also determines whether to send an alert message to one or more of the user machines, or other entities, for this event (step 58). Certain types of events for particular networked appliances can be categorized as events for which an alert message should be sent. For example, certain events can involve an error in the networked appliance and thus should typically be reported, whereas other events may simply relate to status information or a general operation of the networked appliance. The events for which an alert message should be sent can be predetermined or dynamically changed and updated, and an indication of those types of events can be stored within memory 34 in a data structure that associates those events with alert messages.

If an alert message should be sent (step 60), the networked appliance captures and formats a set of the indications of the events for the message (step 62). In other words, the appliance in effect captures a "snapshot" of the events relating to or associated with the event resulting in the alert message. For example, application 36 may be implemented with a Java applet, which can be used by processor 32 to access the recorded indications of events and retrieve a certain number of the most recent events. In one particular embodiment, for example, the appliance maintains a recordation of the last fifty events for the appliance among those events being monitored, and the last five events are captured within the fifty for transmitting with an alert message. The alert message thus includes in this example a set of events having the closest temporal relation to the event causing the alert. Other numbers of total events and a set of events can be used. Selection of the set of events can be based upon a wide variety of factors in relation to the event causing the alert, such as, for example, the following: a temporal relation to the event; types of events recorded; relationships between the alert event and recorded events; the type of appliance being monitored; or other criteria. The application then formats the events for network transmission and can also include other information with the events such as an identification of the networked appliance and its geographic or network location.

The appliance determines whether to send the alert message directly to system server or web site 38 (step 63). In particular, it can send the alert message, and associated set of events, to a user machine, to a system server or web site, or to both; also, it can send the information to more than one of each of those entities. In order to make that determination, the appliance can store in memory 34 a table or other data structure specifying the entities that should receive the information, and it can also specify network addresses for the entities such as, for example, Uniform Resource Locators (URLs).

If the appliance is configured to send an alert message directly to a system server or web site, it posts an alert message to the one or more system servers or web sites with the set of events in a file, for example (step 65). Otherwise, it can post an alert message to one or more of the user machines 12 and 14 with the set of events in a file, for example, and a link to system server or web site 38 (step 64). If the appliance is configured to send an alert message to both a user computer and a system server or web site, it can perform both steps 64 and 65 either simultaneously or in any order. The events for posting in step 64 can be saved in, for example, a hidden file so that they are associated with the alert message but not displayed to a user; alternatively, the events can be selectively displayed to the user along with the alert message. For step 65, the events can also be saved in a hidden file to use the same data structure for saving the events for both steps 64 and 65, or they can be saved in a different type of file or data structure for step 65.

As part of determining which entities should receive an alert message for step 64, the appliance can determine which of the one or more user machines should receive the posted information. It can post the alert message to the last user machine to send data to the appliance, for example, or be programmed to send the alert message to one or more of the user machines based upon particular criteria such as an identification of users at the user machines, users' interaction with appliances, the type of alert message, or the type of appliance transmitting the alert message. The alert message and set of events in the file can be transmitted for steps 64 and 65 via a browser-type application using, for example, standard Internet communication protocols such as HyperText Transport Protocol (HTTP) and Transmission Control Protocol/Internet Protocol (TCP/IP). If the appliance remains on-line with network 40 (step 66), method 50 returns to step 52 to continue recording events for this appliance.

Figure 3:
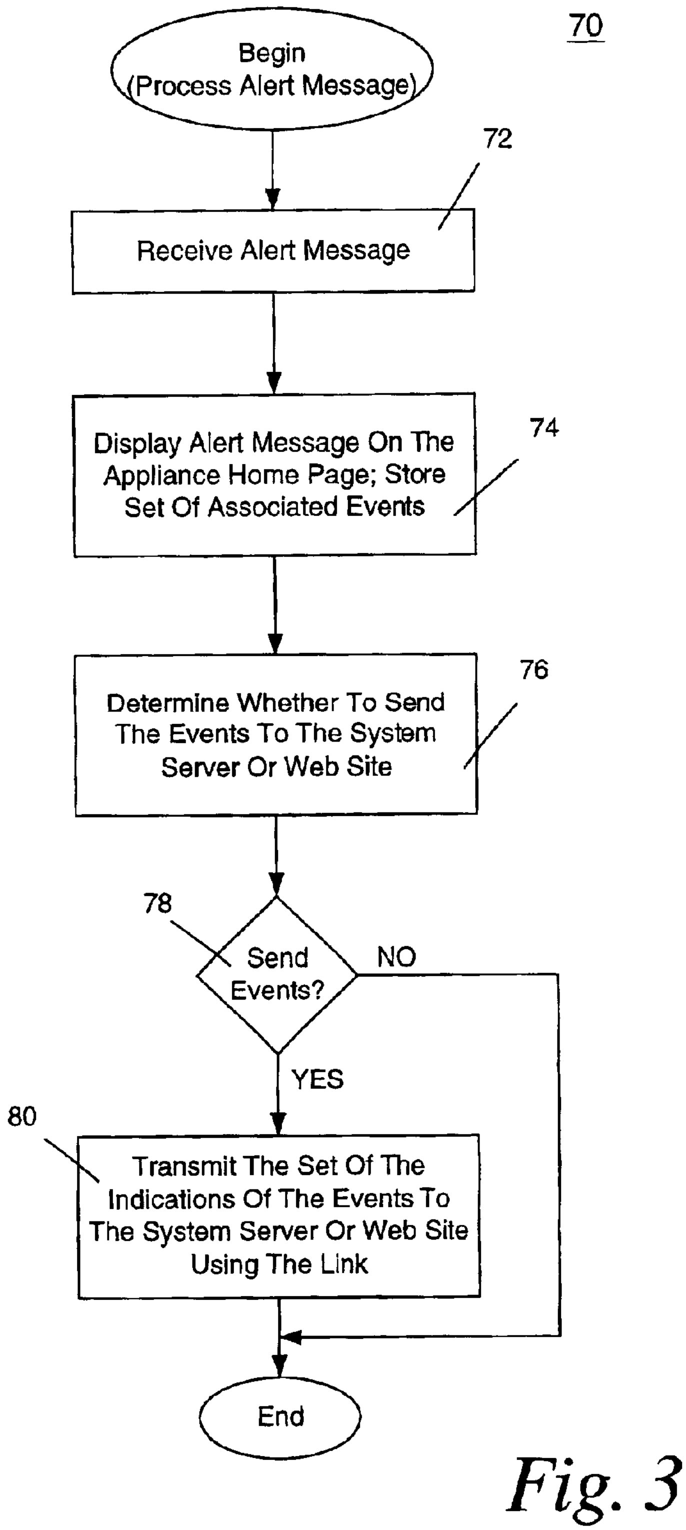
FIG. 3 is a flow chart of a method for receiving alert messages for an appliance and providing associated event information to a system server.

FIG. 3 is a flow chart of a method 70 for processing and displaying alert messages on the user machines 12 and 14. Method 70 may be implemented, for example, in software modules stored within memory 24 for execution by processor 18. In method 70, one or more of the user machines 12 and 14 receives a posted alert message from one of the networked appliances 28 and 30 (step 72). The user machine displays the alert message on display device 16 and stores the associated set of events (step 74).

Figure 4:
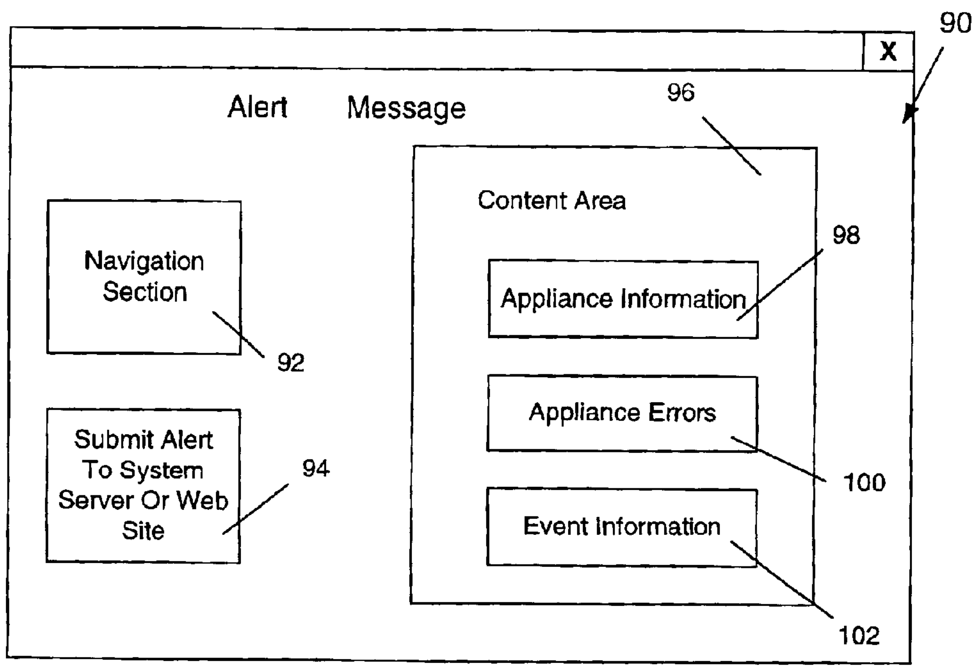
FIG. 4 is a diagram of an appliance home page for displaying an alert message concerning an appliance.

FIG. 4 is a diagram of an exemplary alert message within a home page 90 for an appliance. The alert message can include, for example, a navigation section 92 and a content area 96. Navigation section 92 may include various sections, buttons, or links for selection by the user with a cursor-control device or through other inputted commands in order to perform network navigation relating to the appliance. Content area 96 can include a section 98 for displaying information concerning the appliance which sent the alert message, an indication of an appliance error or other event in a section 100 that resulted in transmission of the alert message, and information concerning events in a section 102. Content area 96 may include additional or fewer sections than those shown. A user can select a section 94, for example, in order to transmit the appliance error and the set of indications of associated events to system server or web site 38. Page 90, and other alert messages, can be formatted as a web page for transmission by a browser-type application, for example, or formatted in other types of pages or screens for transmission and display.

Page 90 provides only one example of an alert message. The term "alert message" refers to notification concerning a particular event, which can include, for example, errors in That information may be transmitted automatically, directly to the system server or web site, or by the user via interaction with the user machine. It does not necessarily require a separate or manual communication by the user, although a manual communication of the events may be performed as well.

Table 1 provides an example of XML tags defining the "snapshot" for a printer as a networked appliance. Those tags can be used in this example to generate an XML string capturing the corresponding set of indications of events. The tags in this example define the types of events to record for the printer. The information in Table 1 is provided for illustrative purposes only to show an exemplary implementation of the present invention. The type of information to record, such as the tags, and the particular format for recording the information may depend upon, for example, the type of networked appliance, the particular data structure or programming language used, and the events that a user or other person desires to be recorded.

TABLE 1

| Iteration | | | | | | | Definition |
|---|---|---|---|---|---|---|---|
| 1 | 2 | 3 | 4 | 5 | 6 | 7 | |
| XML Version | | | | | | | |
| Device Configuration | | | | | | | |
| | Printer Information | | | | | | Base information of the device |
| | | Product Name | | | | | Full name of the product |
| | | Printer Number | | | | | Model number |
| | | Serial Number | | | | | Serial number |
| | | Firmware Datecode | | | | | Version Number for printer-internal software |
| | | Page Counts | | | | | Page counts for color, B&W and total page count |
| | | | Total Page Count | | | | Sum of black and white plus color |
| | Event Log | | | | | | Log of events (or errors) |
| | | Event | | | | | Definition of a single event (repeated tag) |
| | | | Number | | | | Error sequence number |
| | | | Error Code | | | | Error number |
| | | | Page Count | | | | Page count corresponding to the error number |

appliance operation, events relating to a particular type of appliance operation or status, or events for which a user or other person desires notification. The alert message can selectively include a display of the set of indications of events to the user, as illustrated in section 102 in page 90, or not include that display. A hidden file, for example, can be used to save the set of indications of events associated with the alert message so that the set is not displayed to the user but is still associated with the alert message; alternatively, the set can be displayed to the user.

Method 70 then determines whether to send the events to system server or web site 38, or other machines or web sites (step 76). It may send the events based upon user input, such as a user's selection of section 94 or other inputted command. Alternatively, it may transmit the events automatically upon detecting transmission of the alert message to the user machine. If the user machine determines that the events are to be sent (step 78), the user machine transmits the set of the indications of the events to system server or web site 38 using the link associated with the page containing the alert message (step 80). The link may represent, for example, a network address or URL identifying a network location of a system server or web site. The information may be transmitted via network 40 using standard Internet communication protocols as identified above.

Accordingly, system server or web site 38, or other machine, may electronically receive an indication of an error or other event in a networked appliance along with a set of indications of events relating to that error or other event.

While the present invention has been described in connection with an exemplary embodiment, it will be understood that many modifications will be readily apparent to those skilled in the art, and this application is intended to cover any adaptations or variations thereof. For example, different software processing, various types of networked appliances, and various events for recording, may be used without departing from the scope of the invention. This invention should be limited only by the claims and equivalents thereof.

What is claimed is:

1. A method for gathering data and providing messages concerning a networked appliance, comprising:

detecting an occurrence of an event relating to the networked appliance;

recording an indication of the event;

determining whether the event is associated with an alert message;

capturing snapshots of a plurality of events associated with the event resulting in the alert message;

determining whether to send the alert message and the snapshots to a user machine, a system server, or a web site; and selectively transmitting the alert message and the snapshots via a network to the user machine, the system server, or the web site based upon the determining.

2. The method of claim 1 wherein the recording step includes caching the indication of the event in real-time.

3. The method of claim 1 wherein the recording step includes saving an identification of the networked appliance with status information concerning the networked appliance.

4. The method of claim 1 wherein the transmitting step includes posting a page to the user machine providing the alert message to the user machine and saving the indication of the event.

5. The method of claim 4, further including providing with the page a link to the system server or the web site for permitting transmission of the indication of the event from the user machine to the system server or the web site.

6. The method of claim 1, further including:

recording a plurality of indications of events relating to the networked appliance; and selecting a set of the plurality of indications of events for transmission with the alert message.

7. The method of claim 6 wherein the selecting step includes saving the set in a hidden file associated with the alert message.

8. The method of claim 1 wherein the recording step includes determining which events to detect based upon a type of the networked appliance.

9. An apparatus for gathering data and providing messages concerning a networked appliance, comprising:

a detect module for detecting an occurrence of an event relating to the networked appliance;

a record module for recording an indication of the event;

a determine module for determining whether the event is associated with an alert message;

a capture module for capturing snapshots of a plurality of events associated with the event resulting in the alert message;

a determine module for determining whether to send the alert message and the snapshots to a user machine, a system server, or a web site; and a transmit module for selectively transmitting the alert message and the snapshots via a network to the user machine, the system server, or the web site based upon the determining.

10. The apparatus of claim 9 wherein the record module includes a module for caching the indicating of the event in real-time.

11. The apparatus of claim 9 wherein the record module includes a module for saving an identification of the networked appliance with status information concerning the networked appliance.

12. The apparatus of claim 9 wherein the transmit module includes a module for posting a page to the user machine providing the alert message to the user machine and saving the indication of the event.

13. The apparatus of claim 12, further including a module for providing with the page a link to the system server or the web site for permitting transmission of the indication of the event from the user machine to the system server or the web site.

14. The apparatus of claim 9, further including:

a module for recording a plurality of indications of events relating to the networked appliance; and a select module for selecting a set of the plurality of indications of events for transmission with the alert message.

15. The apparatus of claim 14 wherein the select module includes a module for saving the set in a hidden file associated with the alert message.

16. The apparatus of claim 9 wherein the record module includes a module for determining which events to detect based upon a type of the networked appliance.

17. A method for gathering data and providing messages concerning a networked appliance, comprising:

detecting a plurality of occurrences of events relating to the networked appliance;

recording indications of the plurality of events;

determining that at least one of the events is associated with an alert message;

capturing snapshots of the plurality of events associated with the event resulting in the alert message;

selecting a set of the snapshots based upon the at least one events;

determining whether to send the alert message and the snapshots to a user machine, a system server, or a web site; and transmitting the alert message and the snapshots via a network to the user machine, the system server, or the web site.

18. The method of claim 17 wherein the transmitting step includes transmitting a page including the alert message and a link to the system server or the web site.

19. The method of claim 18, further including providing within the page a section for selection by a user to submit the alert message to the system server or the web site.

20. The method of claim 17, further including formatting the set of indications into a file associated with the alert message.

* * * * *